Patented Nov. 16, 1943

2,334,277

UNITED STATES PATENT OFFICE 2,334,277

HEAT- AND STORAGE-STABLE CHLORINATED OLEFINIC POLYMER AND PROCESS

Charles E. Morrell, Elizabeth, Per K. Frolich, Westfield, and Lewis A. Bannon, Roselle, N. J., assignors, by mesne assignments, to Jasco, Incorporated, a corporation of Louisiana Application October 10, 1939, Serial No. 298,750

4 Claims. (Cl. 260—772)

This invention relates to chlorinated olefinic polymeric substances such as polymers produced from isobutylene, and relates particularly to the production of heat-stable chlorinated polymeric compounds of desirable color characteristics and to the production of composite mixtures of chlorinated polymers and chlorinated rubber.

It has been found possible by a variety of methods to chlorinate polymeric substances of the general type of polyisobutylene as produced by the low temperature polymerization of isoolefins by Friedel-Crafts type catalysts, but the resulting chlorinated substances have not been satisfactorily heat-stable, and difficulty has been encountered in obtaining products of satisfactory color.

The present invention is in part based on the simultaneous chlorination of such polymeric substances with, or in the presence of, rubber, the rubber for many uses being preferably present in relatively small proportions. The chlorination reaction is preferably conducted in darkness under controlled conditions of temperature and pressure, and preferably with the polymer and rubber in solution in a solvent inert to chlorine such as chlorinated hydrocarbons. But alternatively it may be conducted in sunlight, or in the presence of diffused daylight, either natural or artificial, or in artificial ultraviolet radiation, or it may be conducted in darkness at room temperature and pressure, the essence of the invention being the presence of at least small proportions of rubber to improve the heat stability and to give a product possessing good color characteristics. Thus, the substance of the invention is a white, heat-stable, chlorinated polymer containing small proportions of chlorinated rubber substance, and the process of the invention consists in the chlorination of an olefinic polymer in the presence of rubber. Other objects and details of the invention will be apparent from the following description:

The raw material for practicing the invention is an olefinic polymer such as polyisobutylene, in the form obtained by polymerizing liquid isobutylene in the presence of suitable diluents, refrigerants and other liquefiable, gaseous hydrocarbons by the application thereto of a Friedel-Crafts type catalyst such as boron trifluoride at low temperatures ranging from $-10°$ C. to $-150°$ C. The resulting polymer is separated from the diluent-refrigerant substances and from the catalyst, and washed to remove traces of catalyst and other undesired substances. The resulting polymer may have a molecular weight ranging from 1,000 to 250,000 or more, and its physical characteristics range from those of a sticky, viscous oil to those of a rubbery solid.

In practicing the invention the polymer is dissolved, preferably in the proportion of 5% to 10%, in a suitable solvent such as carbon tetrachloride. Such a solution of relatively low concentration is preferable because of the high viscosities of solutions obtained when larger proportions of the polymer are dissolved in the solvent.

Simultaneously, a suitable amount of rubber, preferably unvulcanized, and preferably of a relatively high grade, is similarly dissolved either in the same solvent with the polymer or in a separate portion of solvent, and added to the polymer solution. For the protection of the chlorinated polymer against heat breakdown, and for producing a clear white, chlorinated product, from 1% to 10% of rubber is ordinarily sufficient, and is the preferred amount. Alternatively, however, where a little color and a lower resistance to heat are permissible, a smaller amount of rubber than 1% may be utilized; and conversely, for some purposes, larger amounts of rubber up to approximately 90% may be utilized.

When the preparation of the solution is completed the chlorination reaction proper is begun. This reaction, as pointed out above, is preferably conducted in a closed container under controlled conditions of temperature and pressure. No special processing to remove traces of iron is required, but it is preferable to avoid the introduction of iron where possible, since the larger the amount of iron present, the more difficulty is encountered in keeping the product heat-resistant and white. The chlorination may be conducted in a closed receptacle of corrosion-resistant nickel alloy, but it is preferable to conduct the chlorination in a glass-lined or nickel or nickel-lined reaction chamber in order to reduce the amount of adulterant iron to the minimum.

The solution of polymer is then introduced into a pressure reactor having temperature control means. This reactor is preferably either glass lined, or nickel lined, or preferably of solid nickel, since nickel and nickel salts do not catalyze the thermal breakdown of the polymer as do iron, aluminum and zinc.

Figure 1:
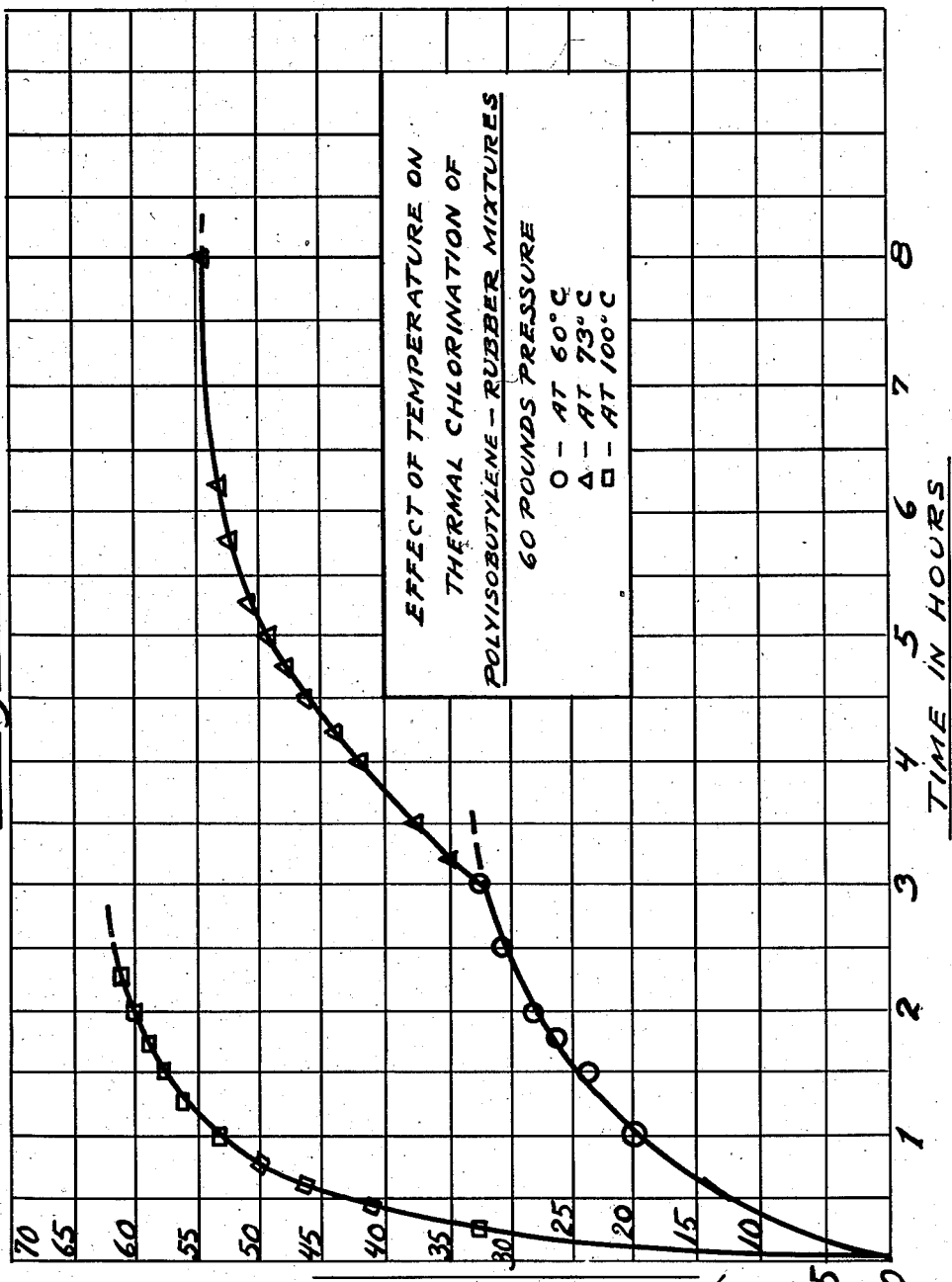
Fig. 1 is a characteristic curve showing the rate of chlorination of mixtures of polyisobutylene and rubber in the ratio of approximately 10% of rubber at several predetermined temperatures and pressures.
Figure 2:
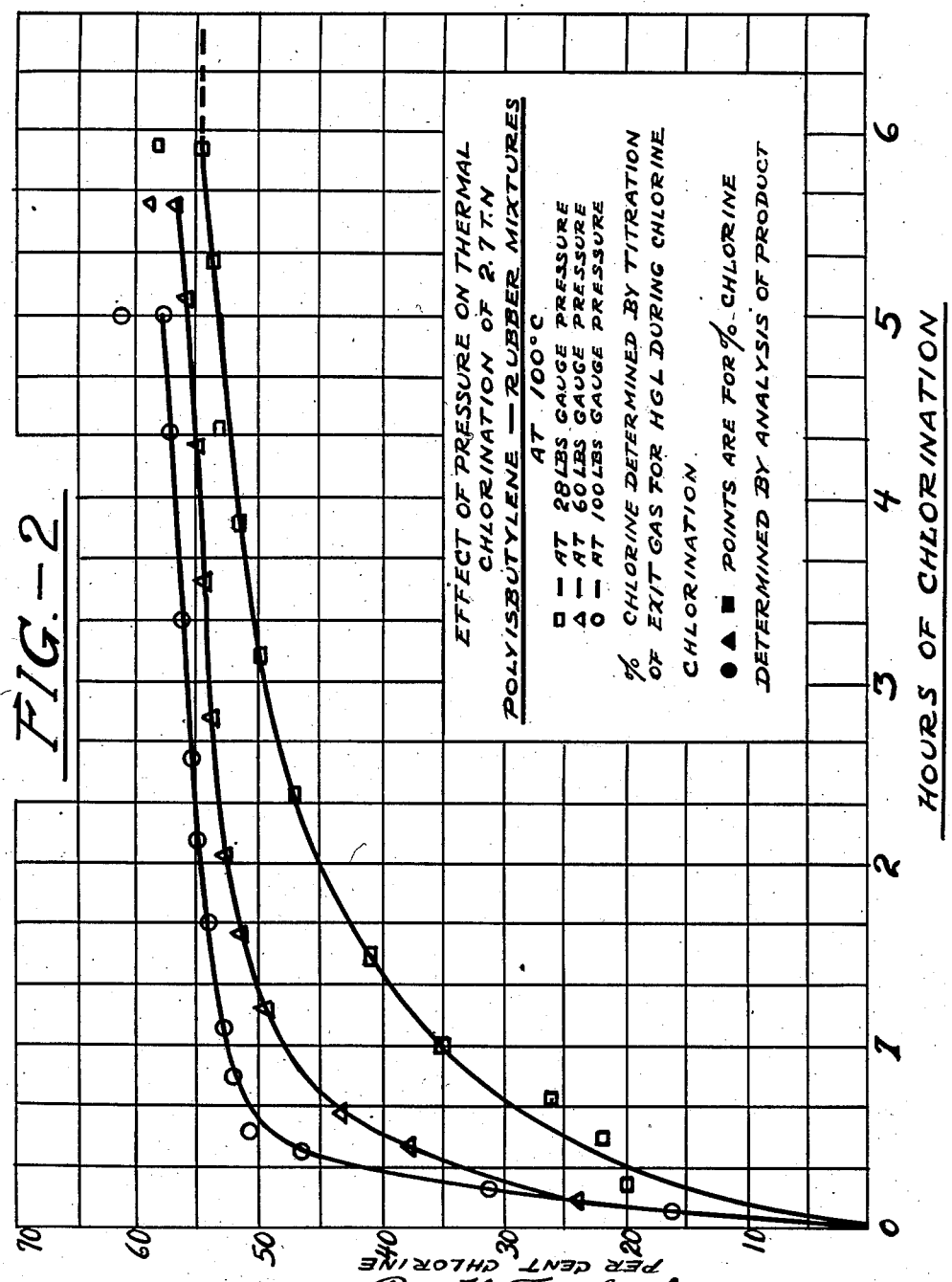
Fig. 2 is a similar set of characteristic curves showing the effect of change of pressure upon the rate of chlorination of mixtures of polyisobutylene and rubber at a predetermined temperature.
Figure 3:
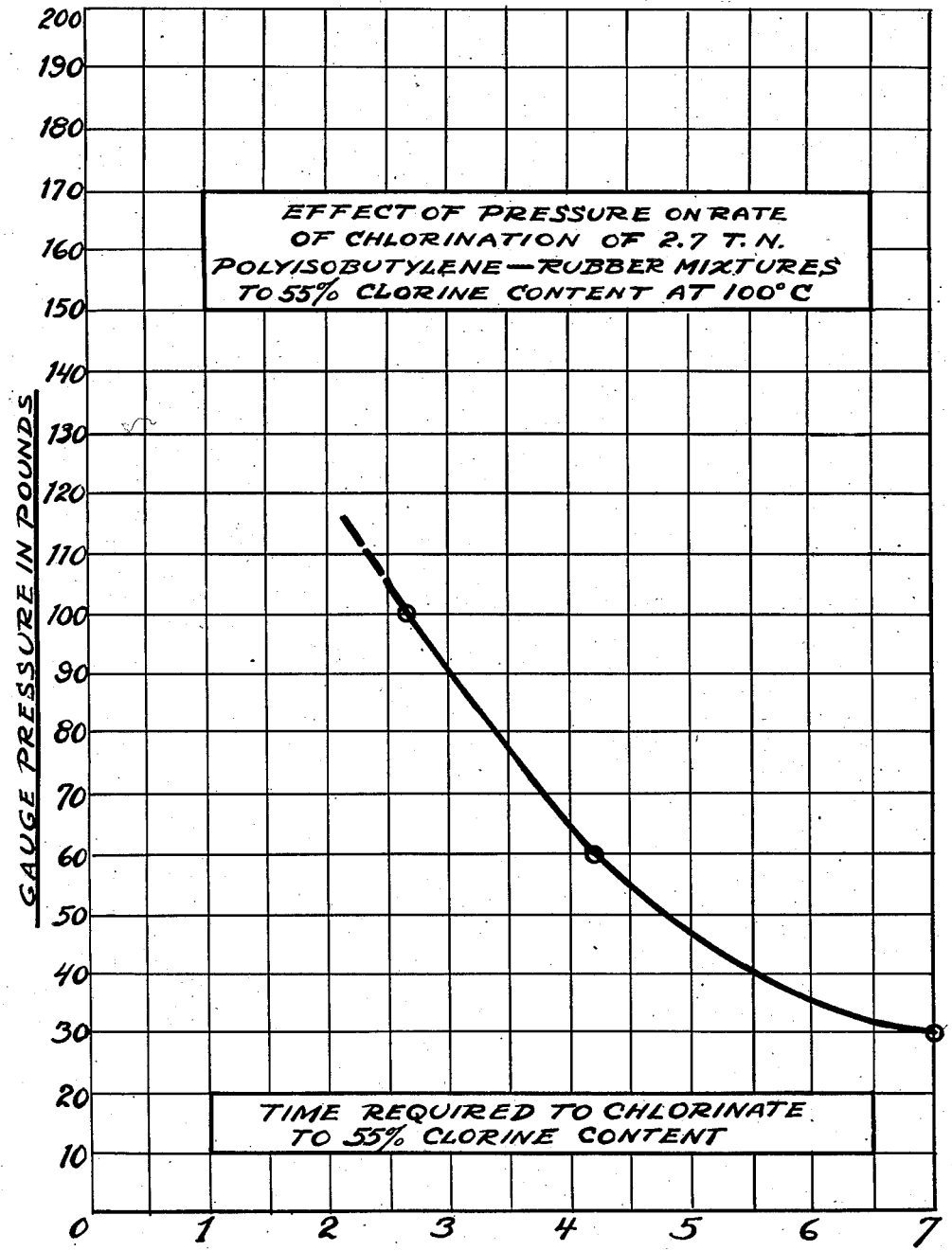
Fig. 3 is a characteristic curve showing the relationship between the rate of chlorination and reactor pressure.

The chlorination may be conducted by bubbling elemental chlorine gas through the solution of polymer and rubber. Simultaneously, the reaction chamber and the contained polymer solution are brought to a desired temperature by such heating means as a steam jacket or chilled brine jacket upon the reactor. The introduction of the chlorine and the removal of the hydrochloric acid gas produced by the reaction is then continued at the desired pressure as well as the desired temperature until the reaction substantially ceases, as is shown in Figs. 1 and 2.

If the chlorination is conducted at room temperature and atmospheric pressure the resulting product will contain approximately 25% of chlorine. To introduce larger quantities of chlorine, the chlorination may be conducted at higher temperatures and pressures. A pressure of 60 pounds to the square inch and a temperature of 60° C. will introduce approximately 35% of chlorine into the product; a pressure of 60 pounds and a temperature of 73° C. will introduce approximately 55% of chlorine into the polymer; and a pressure of 60 pounds and a temperatuer of 100° C. will introduce approximately 63% of chlorine into the polymer. At 100° C. a pressure of 28 pounds to the square inch will introduce approximately 55% of chlorine into the polymer; 60 pounds pressure will introduce approximately 57% of chlorine; and 100 pounds pressure will introduce approximately 58% to 59% of chlorine, as is shown in Figs. 1 and 2.

When the chlorine has substantially ceased to be absorbed by the polymer solution, the introduction of the chlorine may be stopped, and the solution withdrawn from the reaction chamber. The solvent may be removed from the chlorinated polymer in several different ways. A convenient procedure is by precipitation with alcohol. For this purpose, varying amounts of precipitant liquid such as alcohol or ether or ketone or other oxygenated liquids may be added to the solution of chlorinated polymer in a proportion of from 10% to 100% of the original bulk of solution. The precipitated polymer may then be filtered out or decanted or otherwise separated, and the solvent may be fractionally distilled to separate the respective components. Alternatively, the solution may be treated with substantial quantities of boiling water or steam which serve to drive off the solvent, leaving behind the chlorinated polymer. As between the two processes, it may be noted that the treatment with boiling water retains in the chlorinated polymer all of the original polymer without regard to the molecular weight, and all of the chlorinated material, without regard to the molecular weight, whereas precipitation by minimum amounts of oxygenated solvent may be utilized for a fractional separation between different molecular weights, the higher molecular weight portions being the first to precipitate.

The resulting material is a white solid which in the lower ranges of chlorine content is plastic and, in the very lowest ranges, slightly sticky and stringy. The higher percentages of chlorine result in a chlorinated substance which tends to be more or less friable, and even brittle. The lower ranges of chlorine content may show a small amount of cold flow and small amounts of cold plasticity. The higher ranges of chlorine content give a product which, while it does not fuse, is thermo plastic and may be used for moulding with or without fillers, pigments, fabric, etc.

The characteristics of the resulting material are well shown in the following table, which presents the results of a series of chlorinations of various types of polyisobutylene (Vistanex-polybutene) both in its original condition, in a metal-free condition and in admixture with various amounts of rubber. These results show that the material which is wholly metal free chlorinates to a stable white product; that polymer not free from metal chlorinates to an unstable, discolored substance, and that polymer not metal free but containing rubber also chlorinates to a white, stable product.

*Properties of Vistanex chlor-polybutene samples containing rubber and without rubber*

| Sample chlorinated | Method of chlorination | Per cent chlorine content of product | Color of solvent-free product | Stability at 125° C. for 24 hours | | Abs. vis. (20% soln. in toluol) CP |
|---|---|---|---|---|---|---|
| | | | | Percent HCl | Color | |
| M. M. V-P [1] | Photo-chem. at −30° C.[2] | 55 | White | 3.41 | | 14.0 |
| M. M. V-P (metal free) | Photo-chem. at 55° C | 43 | do | 0.741 | L. gray | 1.48 |
| Do | do | 71 | do | 0.348 | do | 0.89 |
| L. M. V-P | do | 51.1 | do | 0.56 | L. brown | 2.14 |
| M. M. V-P | Thermal at 100° C | 57.4 | Black | | | |
| L. M. V-P | do.[3] | Ca. 65 | D. brown | 0.77 | Black | 1.02 |
| M. M. V-P (metal free) | do | 61.5 | White | 0.237 | L. tan | 1.14 |
| L. M. V-P+ 5% rubber | do | 69.0 | do | 0.18 | do | 1.26 |
| L. M. V-P+10% rubber | do | 51.0 | do | 0.00 | do | 14.7 |
| Do | do | 68.4 | do | 0.06 | L. brown | 1.52 |
| M. M. V-P+10% rubber | do | 66.5 | do | 0.315 | L. tan | 1.89 |
| M. M. V-P+25% rubber | do | 66.6 | do | 0.361 | White | 2.90 |
| M. M. V-P+40% rubber | do | 69.5 | do | 0.216 | do | 5.33 |
| M. M. V-P+50% rubber | do | 65.0 | do | 0.057 | do | 105.0 |
| Do | do | 65.0 | do | 0.291 | do | 20.7 |
| Do | do | | do | 0.072 | do | 89.0 |
| M. M. V-P+75% rubber | do | 69.8 | do | 0.180 | do | 11.4 |
| 100% rubber | (Commercial Tornesit) | 68 | do | 0.326 | do | 6.5 |
| L. M. (5.9 T. N.) V-P+10% rubber (65 lbs. plant run) | Thermal at 100° C | 63 | do | 0.36 | Tan | 2.689 |

[1] M. M. V-P is medium molecular weight Vistanex polybutene, while L. M. is low molecular weight material (5.9 T. N.).
[2] Photo-chem. chlorination in the presence of a Hg-vapor lamp.
[3] Thermal chlorination at 60 lbs. pressure in nickel reactor.

The resulting chlorinated polymeric material is particularly desirable for paints, lacquers, enamels and insulating materials as well as for coating compositions generally in combination with both the natural resins and the synthetic resins, and also for printing inks, leather finishes, insulating varnish, both for impregnating and brush or spray coatings, and similar uses. The solubility of the chlorinated product varies according to the proportion of chlorine introduced, and with the solvent, the lower proportions of chlorine giving a material which is relatively highly soluble in hydrocarbons and chlorinated hydrocarbons; whereas the higher percentages of chlorine give a material which is soluble in some oxygenated solvents, and compatible with the ordinary drying oils and the natural and synthetic resins. Thus, by proper choice of the chlorine content, the material can be made to be compatible with substantially any of the natural or synthetic gums, resins and solvents.

The process as above disclosed is presented as a batch chlorination procedure. This, however, is not essential to the invention, since it is equally possible to chlorinate by a countercurrent flow procedure. For this purpose a series of reactors, preferably substantial size chambers having top and bottom openings and containing porous fillings such as Raschig rings may be utilized. If the several reactors are at different levels, the polymer solution may be introduced at the top of the highest reactor and allowed to flow slowly downward over the Raschig rings to the bottom drain, and from there into the next lower container, while the stream of chlorine-contained gas is introduced at the bottom of the lowest container and passes upward to a discharge from the top of the highest placed container. The embodiment is particularly useful for processes conducted at or near atmospheric pressure, or at pressures below atmospheric.

Alternatively, a plurality of containers may be used without fillings, but equipped with pumps which withdraw the solution from the bottom of one container and deliver it to the next, the chlorine being passed in sequence from reactor container to container. This arrangement is particularly advantageous where the higher pressures and higher temperatures are used, also it is adapted to the production of the more highly chlorinated polymer, in view of the longer time of contact of the solution with the chlorine-containing gas.

Thus, the process of the invention consists of the chlorination of a polymer, particularly a polymer of the isobutylene type, in the presence of rubber, to produce a white, thermally stable substance which may be classified as a gum or resin; and the product of the invention is a white, thermally stable, synthetic gum or resin.

While there are above disclosed but a limited number of embodiments of the invention, it is possible to produce still other embodiments without departing from the inventive concepts herein disclosed, and it is therefore desired that only such limitations be imposed on the appended claims as are stated therein or required by the prior art.

The invention claimed is:

1. The process of preparing a heat- and storage-stable chlorinated polyisobutylene, comprising the steps of dissolving polyisobutylene and natural rubber in a chlorine-resistant solvent, and chlorinating the polymer and rubber.

2. The process of preparing a heat- and storage-stable chlorinated polyisobutylene, comprising the steps of dissolving polyisobutylene and natural rubber in a chlorine-resistant solvent, and chlorinating the polymer and rubber in the dark.

3. The process of preparing a heat- and storage-stable chlorinated polyisobutylene, comprising the steps of dissolving polyisobutylene and natural rubber in a chlorine-resistant solvent, and chlorinating the polymer and rubber under controlled conditions of temperature and pressure.

4. The process of preparing a heat- and storage-stable chlorinated polyisobutylene, comprising the steps of dissolving polyisobutylene and natural rubber in a chlorine-resistant solvent, and chlorinating the polymer and rubber under controlled conditions of temperature and pressure in the dark.

CHARLES E. MORRELL.
PER K. FROLICH.
LEWIS A. BANNON.